US012671533B2

(12) United States Patent
Van Der Velde et al.

(10) Patent No.: US 12,671,533 B2
(45) Date of Patent: Jun. 30, 2026

(54) METHOD AND APPARATUS TO ENHANCE ON QUALITY OF EXPERIENCE IN THE MOBILE COMMUNICATIONS

(71) Applicant: Samsung Electronics Co., Ltd., Suwon-si (KR)

(72) Inventors: Himke Van Der Velde, Staines (GB); Sangbum Kim, Suwon-si (KR); Seungbeom Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 294 days.

(21) Appl. No.: 18/290,413

(22) PCT Filed: May 11, 2022

(86) PCT No.: PCT/KR2022/006736
§ 371 (c)(1),
(2) Date: Nov. 13, 2023

(87) PCT Pub. No.: WO2022/240185
PCT Pub. Date: Nov. 17, 2022

(65) Prior Publication Data
US 2024/0259148 A1 Aug. 1, 2024

(30) Foreign Application Priority Data

| May 11, 2021 | (GB) | ..................................... 2106702 |
| May 9, 2022 | (GB) | ..................................... 2206760 |
| May 9, 2022 | (GB) | ..................................... 2206762 |

(51) Int. Cl.
*H04L 5/00* (2006.01)
*H04W 72/231* (2023.01)

(52) U.S. Cl.
CPC .......... *H04L 5/0035* (2013.01); *H04L 5/0064* (2013.01); *H04L 5/0096* (2013.01); *H04W 72/231* (2023.01)

(58) Field of Classification Search
CPC ... H04L 5/0035; H04L 5/0064; H04L 5/0096; H04L 41/0853; H04L 41/5067;
(Continued)

(56) References Cited

U.S. PATENT DOCUMENTS

| 2022/0085930 A1* | 3/2022 | Takeda .................. H04L 5/0098 |
| 2022/0132333 A1* | 4/2022 | Mattam ................. H04L 5/0035 |
| 2022/0312417 A1* | 9/2022 | Venkata ............... H04W 76/27 |

FOREIGN PATENT DOCUMENTS

| EP | 3 565 298 A1 | 11/2019 |
| GB | 2601233 A | 5/2022 |
(Continued)

OTHER PUBLICATIONS

Catt, Discussion on QoE collection start and stop, R2-2104035, 3GPP TSG-RAN WG2 Meeting #113bis-e, e-Meeting, Apr. 2, 2021.
(Continued)

*Primary Examiner* — Dady Chery
(74) *Attorney, Agent, or Firm* — Jefferson IP Law, LLP

(57) ABSTRACT

The disclosure relates to a 5G or 6G communication system for supporting a higher data transmission rate. Disclosed is a method of Quality of Experience, QoE, reporting, whereby a User Equipment, UE, transfers QoE data to a connected telecommunication network, wherein UE push mode, U Mode, is employed in all circumstances to transfer QoE information from the UE to the telecommunication network.

8 Claims, 4 Drawing Sheets

(58) Field of Classification Search

CPC ... H04W 72/231; H04W 76/15; H04W 76/34; H04W 8/24

See application file for complete search history.

(56) References Cited

FOREIGN PATENT DOCUMENTS

| WO | 2021/064254 A1 | 4/2021 |
|----|----------------|---------|
| WO | 2022/082641 A1 | 4/2022 |
| WO | 2022/086214 A1 | 4/2022 |
| WO | 2022/203478 A1 | 9/2022 |
| WO | 2022/212699 A1 | 10/2022 |

OTHER PUBLICATIONS

Catt, Discussion on NR QoE configuration, R2-2104034, 3GPP TSG-RAN WG2 Meeting #113bis-e, e-Meeting, Apr. 2, 2021.

Samsung, General framework for QoE measurements, R2-2103934, 3GPP TSG-RAN WG2 Meeting #113bis-e, e-Meeting, Apr. 2, 2021.

Huawei et al., QoE measurement handling at RAN overload, R2-2103911, 3GPP TSG-RAN WG2 Meeting #113bis-e, e-Meeting, Apr. 2, 2021.

Qualcomm Incorporated, Handling of NR QoE reporting, 3GPP TSG-RAN WG2 Meeting #113-e, R2-2101339, Electronic, Jan. 25-Feb. 5, 2021.

Vivo, UE assistance information for power saving, 3GPP TSG-RAN WG2 Meeting #109 electronic, R2-2000369, 3GPP TSG-RAN WG2 Meeting #109, Jun. 3, 20, E-Meeting, Feb. 24-Mar. 6, 2020.

Convida Wireless, Comparison of SCG deactivation solutions, 3GPP TSG-RAN WG2 Meeting #114-e, R2-2106039, Online, May 19-27, 2021.

3GPP TS 32.422 V17.2.0 (Mar. 2021), 3rd Generation Partnership Project; Technical Specification Group Services and System Aspects;Telecommunication management; Subscriber and equipment trace; Trace control and configuration management, Mar. 2021.

3GPP TS 26.247 V16.4.1 (Oct. 2020), 3rd Generation Partnership Project;Technical Specification Group Services and System Aspects; Transparent end-to-end Packet-switched Streaming Service (PSS); Progressive Download and Dynamic Adaptive Streaming over HTTP (3GP-DASH), (Release 16), Oct. 2020.

3GPP TS 38.331 V16.4.1 (Mar. 2021), 3rd Generation Partnership Project; Technical Specification Group Radio Access Network; NR; Radio Resource Control (RRC) protocol specification; (Release 16), Mar. 2021.

3GPP TS 38.331 V17.6.0 (Sep. 2023), 3rd Generation Partnership Project; Technical Specification Group Radio Access Network; NR; Radio Resource Control (RRC) protocol specification, (Release 17), Sep. 2023.

United Kingdom Intellectual Property Office Search Report dated Oct. 19, 2022, issued in United Kingdom Application No. GB 2206762.3.

United Kingdom Intellectual Property Office Search Report dated Oct. 18, 2022, issued in United Kingdom Application No. GB 2206760.7.

International Search Report and written opinion dated Aug. 18, 2022, issued in International Application No. PCT/KR2022/006736.

ETSI MCC, Report of 3GPP TSG RAN WG2, meeting #113bis-e, Online, 3GPP TSG-RAN WG2 meeting #114-e, R2-2106641, XP051998468, Apr. 12-20, 2021.

Ericsson, SCG deactivation procedures, 3GPP TSG-RAN WG2 #113bis-e, R2-2103807, XP051992270, Apr. 12-20, 2021.

Apple Inc., Remaining open items on SCG deactivation feature, 3GPP TSG-RAN WG2 Meeting #113e, R2-2101464, XP051974345, Jan. 25-Feb. 5, 2021.

CMCC, Discussions on deactivation of Scg, 3GPP TSG-RAN WG2 Meeting #113-bis electronic, R2-2103722, XP052175118, Apr. 2021.

Extended European Search Report dated Aug. 23, 2024, issued in European Application No. 22807832.5-1215.

* cited by examiner

METHOD AND APPARATUS TO ENHANCE ON QUALITY OF EXPERIENCE IN THE MOBILE COMMUNICATIONS

CROSS-REFERENCE TO RELATED APPLICATION(S)

This application is a U.S. National Stage application under 35 U.S.C. § 371 of an International application number PCT/KR2022/006736, filed on May 11, 2022, which is based on and claims the benefit of United Kingdom application number 2106702.0, filed on May 11, 2021, in the United Kingdom Patent and Trademark Office, of United Kingdom application number 2206760.7, filed on May 9, 2022, in the United Kingdom Patent and Trademark Office, and of United Kingdom application number 2206762.3, filed on May 9, 2022, in the United Kingdom Patent and Trademark Office, the disclosure of each of which is incorporated by reference herein in its entirety.

TECHNICAL FIELD

The present invention relates to Quality of Experience, QoE, reporting. Also, the present invention relates to the configuration of a Secondary Cell Group, SCG, in a telecommunication system and, more particularly to it selective deactivation. It finds particular, but not exclusive use in a Fifth Generation, 5G, system.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (MLE), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

DISCLOSURE OF INVENTION

Technical Problem

The present invention has been made to address at least the above problems and disadvantages and to provide at least the advantages described below.

There are certain difficulties involved in making best use of QoE reporting and it is an aim of embodiments of the present invention to address these and other issues.

Also, as part of Release 17 of the 5G specification, there is a plan to introduce an option to deactivate the Secondary Cell Group, SCG, thereby aiming to resume SCG quicker as compared to when releasing and subsequently adding the SCG.

Solution to Problem

According to the present invention there is provided an apparatus and method as set forth in the appended claims. Other features of the invention will be apparent from the dependent claims, and the description which follows.

According to a first aspect of the present invention, there is provided a method of Quality of Experience, QoE, reporting, whereby a User Equipment, UE, transfers QoE data to a connected telecommunication network, wherein UE push mode, U Mode, is employed in all circumstances to transfer QoE information from the UE to the telecommunication network.

In an embodiment, the QoE information is transferred via use of a MeasReportAppLayer message.

In an embodiment, the MeasReportAppLayer message is used regardless of whether the QoE information is collected in idle/inactive, during pause/overload or in regular connected mode.

In an embodiment, in order to assist the network, the UE provides certain information to the network, wherein the information comprises details of certain UE capabilities.

In an embodiment, the certain information comprises information including whether it supports reporting of QoE information and/or SRB4.

In an embodiment, QoE-related restrictions are imposed, regarding whether the network can move the UE to inactive state.

In an embodiment, the network moves the UE to inactive state even if the UE has any previously collected QoE information stored.

In an embodiment, the network is operable to control whether the UE resumes QoE monitoring upon resuming connection after being idle/inactive or disconnected.

According to a second aspect of the present invention, there is provided a User Equipment, UE, arranged to perform the method of the first aspect.

According to an aspect of the present invention, there is provided a method of QoE reporting, whereby a UE transfers QoE data to a connected network. In particular, the method may find use in 5G systems, but this is not a limitation and other forms of telecommunication system may benefit from embodiments of the invention.

In a preferred embodiment, UE push mode, U Mode, is employed in all circumstances to transfer QoE information from the UE to the network. This makes use of the MeasReportAppLayer message and is used regardless of whether the information is collected in idle/inactive, during pause/overload or regular connected mode.

Further, in a preferred embodiment, in order to assist the network, the UE provides certain information to the network. This information comprises details of certain capabilities, including whether it supports reporting of QoE information and/or SRB4.

Further, in a preferred embodiment QoE-related restrictions are imposed, regarding whether the network can move the UE to inactive state. More preferably, the network moves the UE to inactive even if the UE has any previously collected QoE information stored.

In an embodiment, the network is operable to control whether the UE resumes QoE monitoring upon resuming connection after being idle/inactive or disconnected.

An aspect of the present invention is the general use of network initiated retrieval in connected mode. Some key benefits for such an approach include:

Harmonisation of the procedures used for transfer of QoE information collected during idle, inactive and in connected when pause applies. This reduces UE and network complexity. Furthermore, it limits the amount of standard specification changes.

Embodiments of the invention furthermore provide several different options regarding the further details of the unified approach, that reflect different trade offs between simplicity and flexibility e.g. more signalling changes may result in more network control/additional flexibility.

Also, according to a third aspect of the present invention, there is provided a method of operating a User Equipment, UE, in a telecommunication network wherein the UE provides assistance information to a Master Node, MN, or a Secondary Node, SN, of the telecommunication that the UE wishes a Secondary Cell Group, SCG, to be deactivated.

In an embodiment, in the case where the UE provides assistance information to the MN, then a message, UEAssistanceInformation, is provided with a field, deactivateSCG, to indicate that it prefers SCG deactivation.

In an embodiment, a prohibit timer is used that defines a minimum time in-between UE assistance concerning SCG deactivation.

In an embodiment, the UE is configured to provide different types of assistance information simultaneously.

In an embodiment, options for simultaneous configuration of multiple UE assistance information features concerning SCG preferences include defining conditions specifying in which cases the UE triggers certain UE assistance.

In an embodiment, a first such condition is a rule defining in which case the UE triggers different UE assistance, such as defining in which condition it prefers deactivation of SCG and in which case it prefers release of SCG.

In an embodiment, a second such condition involves the network configuring a time interval which the UE observes between different SCG-related assistance indications.

In an embodiment, the assistance information includes an option to cancel a previous UE preference, including SCG deactivation.

According to a fourth aspect of the present invention, there is provided a User Equipment arranged to perform the method of the third aspect.

Advantageous Effects of Invention

Advantages and salient features of the invention will become apparent to those skilled in the art from the following detailed description, which, taken in conjunction with the annexed drawing, discloses exemplary embodiments of the invention.

Embodiments of the present invention address problems associated with the transfer of QoE information that still remain after the recent agreements on QoE reporting, in particular regarding the use of the MeasReportAppLayer message for transfer of QoE info in connected when no pause. Embodiments of the present invention also address some further detailed options when using mode U always i.e. to transfer all QoE results using this mode regardless of when they were collected.

Also, it is an aim of embodiments of the present invention to indicate that it wishes to deactivate the SCG. Additionally, it is desirable to be able to do this without unduly complicating UE and/or system design and to minimize the impact on other features of the specification.

MODE FOR THE INVENTION

Figure 1:
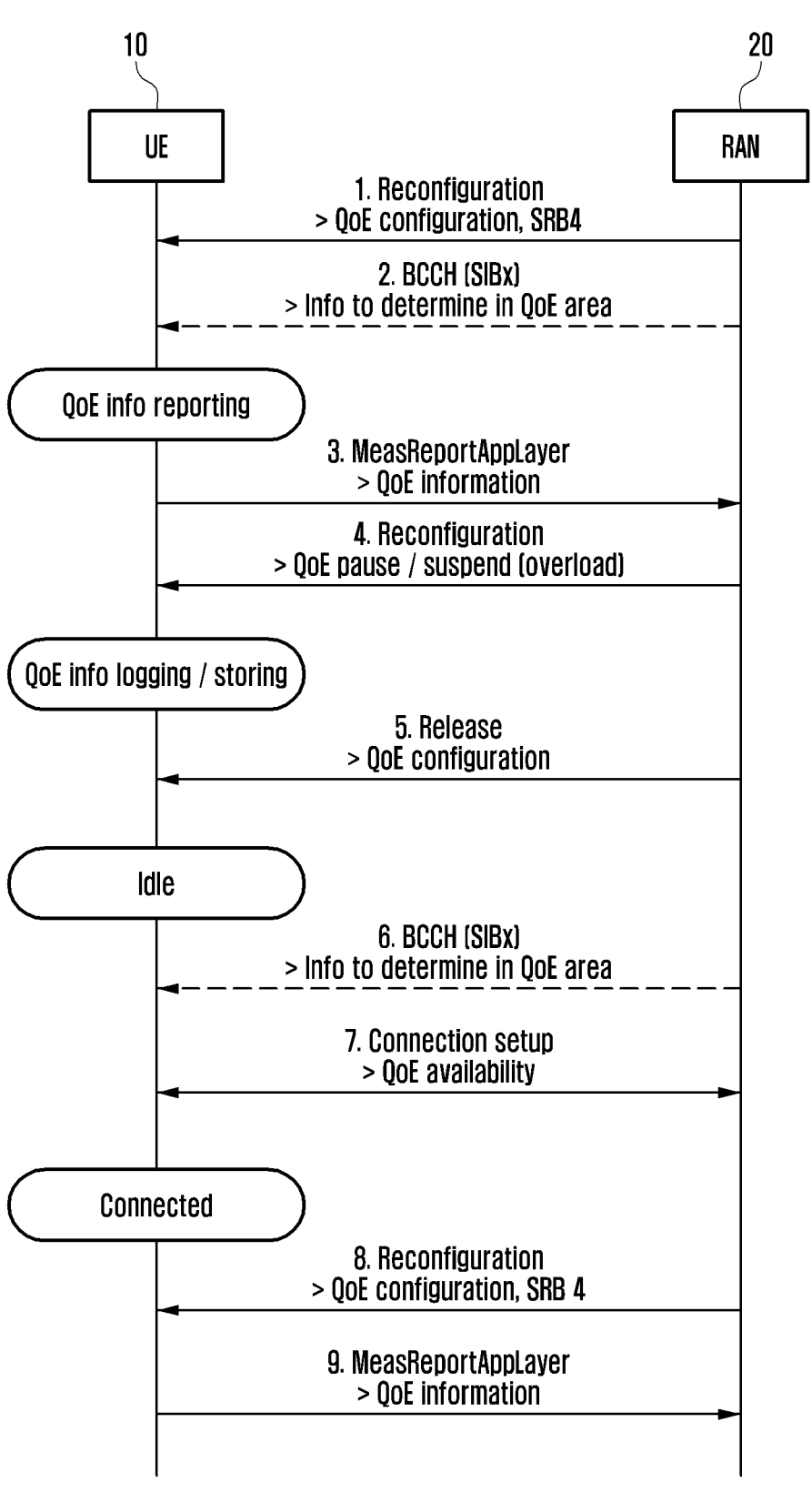
FIG. 1 illustrates a schematic representation of various steps in an embodiment of the invention.

The present invention relates to Quality of Experience, QoE, reporting. Fifth Generation, 5G, or New Radio, NR, networks define a mechanism by which a User Equipment, UE, may provide information regarding quality experienced, referred to as Qualify of Experience (QoE) reporting. Such QoE reporting was introduced in the previous generation, LTE, and the main characteristics of the mechanism defined in LTE are as follows:

Most aspects are defined by upper layers and transparent to AS

Reporting is done in connected mode only

UE reports whether its capable of QoE, with separate capabilities for streaming or Multimedia Telephony Service over IMS, MTSI, service types Network can setup or release the UE to perform QoE reporting by use of the field measConfigAppLayer within the Reconfiguration message. It includes service type (streaming, MTSI) as well as an octet string with NAS configuration (up to 1000 octets) as defined in annex L of TS 26.247

Results are reported by the MeasReportAppLayer message, via a separate Signaling Radio Bearer, SRB, i.e. SRB4, and immediately upon the Non-Access-Stratum, NAS, providing the required information. The message includes service type (streaming, MTSI) as well as an octet string with NAS information (up to 8000 octets) as defined in annex L of TS 26.247

There are certain difficulties involved in making best use of QoE reporting and it is an aim of embodiments of the present invention to address these and other issues.

A study was performed regarding how to support QoE in NR and it was agreed to use the prior art LTE mechanism as a baseline. However, some agreements were made that involve some changes compared to LTE, with the primary ones being as follows:

the network should be able to pause QoE reporting

QoE should be supported in idle/inactive, for Multicast and Broadcast Services, MBS, purposes Definition of these aims does not in itself solve the problems with the prior art, but merely provides a framework within which the solution(s) should lie.

Quality of Experience may effectively re-use some mechanisms defined for Minimising Drive Test, MDT, hence some information on MDT is provided in the following.

A UE that is in an idle or inactive mode may be configured to perform measurement logging for the purpose of MDT. This is referred to as logged MDT. Typically, the UE performs periodic logging of certain measurements that it has available, but in NR the UE can also be configured to log measurements of particular events e.g. when an Out Of Service condition is met.

Some constraints can be defined regarding when the UE should perform logging e.g. for a limited duration or only when in a particular area (i.e when camping on a cell that is part of an area that the network can set as part of the MDT configuration).

It is furthermore possible for the network to specify constraints regarding what the UE shall log. In the prior art LTE system, for example, the UE can be configured to log particular Multimedia Broadcast Multicast Services, MBMS, results for a particular frequency. An NR network can also configure a list of neighbouring frequencies for which the UE should log results. When the UE does not have results for the target frequency, the UE behaviour is different in LTE and NR i.e. in LTE the UE omits a periodic logging entry, while in NR, the UE still adds a logging entry even if this only includes results of the serving cell.

There are two different types of logged MDT, known as signalling and management based. Signalling based MDT applies when the Core Network, CN, indicates a particular UE for which information is to be collected i.e. by International mobile subscriber identity, IMSI, or International Mobile Equipment Identity Software Version, IMEI-SV, etc. Otherwise, in the management based option, the Radio Access Network, RAN, selects the UEs for collecting measurements. In the latter case, the RAN can configure many Ues and it is not a particular problem if a particular UE cannot provide the requested info e.g. due to In Device Coexistence, IDC, problems it may have experienced.

Network signalling and overall control of MDT is described in specification TS 32.422. The request can include a list of Public Land Mobile Networks, PLMNs, an area and a list of measurement types that can be one of following:

M1 (by UE): Reference Signal Received Power, RSRP, and Reference Signal Received Quality, RSRQ, measurements M2 (by UE): Power Headroom measurements M3 (by RAN node): Received Interference Power measurements M4 (by RAN node): Data Volume measurements for Downlink, D L, and Uplink, UL, per Quality of service class identifiers, QCI, per UE M5 (by RAN node): Scheduled IP Throughput, per Radio Access Bearer, RAB, per UE and per UE for the DL, per UE for the UL M6 (by UE and RAN node): Packet Delay measurement, separately for DL and UL, per QCI per UE M7 (by RAN node): Packet Loss rate measurement, separately for DL and UL per QCI per UE M8 (by UE): Received Signal Strength Indicator, RSSI, measurement by UE M9 (by UE): Round Trip Time, RTT, measurement by UE For some of these measurement types (e.g. M1, M8) the RAN should provide results per frequency. The RAN may configure measurements on one or more frequencies and it should be noted that it is up to the RAN to decide which, as the request from the CN does not include any information regarding this. It is noted that for MBMS, the target frequency can be included in the request but this is regarded as an exception.

There now follows a brief summary of some general principles for logged MDT, as used in LTE.

If the network configures LogMDT, any previous configuration is overwritten. The UE reports availability of logMDT upon entering connected setupComp, resume-Comp, reconfigComp (includes Handover, HO, to NR), reestablishComp (e.g. by NR: UE-MeasurementsAvailable-r16), upon which the network may retrieve the information. The UE does not inform the network about whether it still has an ongoing or not expired logMDT configuration e.g. upon transition to connected. The network does not have a context for Ues that are in idle mode, while the context for Ues in inactive so far does not include information regarding logMDT. The Network is not aware if timer T330 has expired, but it might infer something e.g. from retrieved information. This was not essential in the prior art i.e. the network can simply re-assign a new configuration, if desired, and the UE overwrites if T330 has not expired.

Logged measurement results are discarded: 48 hrs after T330 expiry; upon overwriting either in the same or in another Radio Access Technology, RAT; or upon power off or detach.

Note that T330 is started upon receiving LoggedMeasure-mentConfiguration.

For NR, further agreements were reached including the following: a signalling-based logged MDT (sig-LogMDT) configuration should not be overwritten by a management-based MDT (mgm-LogMDT) e.g. following mobility to another RAT.

Note that the initial assumption was that the network would handle this e.g. by the source node indicating to the target node whether the UE is configured with sig-LogMDT (and possibly some more e.g. end time). Such information would be transferred also upon Inter-RAT, IRAT, change (intra-PLMN), but can still only cover Ues that are in inactive/connected, but not Ues in idle, for which the network has no context. Ultimately, it was agreed to use a UE-based mechanism, with details still to be specified.

To date, QoE reporting is not specified in NR. It is planned to be introduced as part of Release 17, REL-17, of NR. Although the procedures as used in LTE, referred to above, are agreed as the baseline for NR, some potential enhancements have been agreed. Hence, the use of a somewhat different approach has been considered.

Moreover, the table below indicates a number of AS related problems or issues that still need to be resolved i.e. some of which were already agreed to be For Further Study (FFS)

TABLE 1

|  | AS functionality | Issues/remarks |
|---|---|---|
| In connected | | |
| General | Support multiple QoE measurements, each with own config and associated results | FFS: whether pausing is to be supported at level of individual QoE measurement and if so, how |
| Configuration | Actual configuration transparent to AS (octet string carrying upper layer info within by field measConfigAppLayer within Reconfiguration message) | Delta signalling upon transition to idle/inactive? |
| Reporting | Using MeasReportAppLayer message | |
| Furthermore | | What to do in case QoE measurement is paused e.g. store with option to retrieve at later stage |
| In idle/inactive | | |
| General | Same as in connected | Same as above |
| Configuration | Similar as in connected (i.e. introduce similar field as measConfigAppLayer in LoggedMeasurementConfiguration? Prioritisation of signalling over management based | Will config be same as in connected?? Support delta signalling upon transition to connected? Can UE either perform QoE or regular LogMDT? If so, is there prioritisation and will UE handle this (alike for signalling based MDT)? |
| Availability indication | Field logMeasAvailable can be included in several messages | |
| Retrieval | UEInformationRequest can include logMeasReportReq. UEInformationResponse can include logMeasReport | |
| Furthermore | | What to do in case QoE measurement is paused e.g. store with option to retrieve at later stage? |

The following options for transfer of QoE information in connected include the following modes Mode N: Network initiates retrieval (i.e. Network pull based approach, same framework as used for logMDT)

Mode U: UE initiates transfer upon arrival from upper layers (i.e. LUE push based approach, alike used for RRM measurements and QoE reporting in LTE)

The following options are available for harmonising the transfer of QoE information collected in idle/inactive, during pause and during non-pause connected:

a) Use mode N always i.e. even if network is not congested b) Use mode N only in specific cases e.g. when network indicates it is congested, with further options:

During the congestion period

For results stored/collected during congestion c) Use mode N only for certain categories of QoE information e.g. specific service type(s)

d) Either specify in standards in which case the UE uses the logMDT mode or introduce means by which network can configure this (in latter caset use of the mode is up to network implementation)

It has been agreed in standardisation meetings to use the MeasReportAppLayer message for transfer of QoE info in connected when no pause. Furthermore, it has been agreed to use SRB4 for the transfer of QoE information.

Embodiments of the present invention address problems associated with the transfer of QoE information that still remain after the recent agreements on QoE reporting, in particular regarding the use of the MeasReportAppLayer message for transfer of QoE info in connected when no pause.

Embodiments of the present invention also address some further detailed options when using mode U always i.e. to transfer all QoE results using this mode regardless of when they were collected.

The present invention relates to the configuration of a Secondary Cell Group, SCG, in a telecommunication system and, more particularly to it selective deactivation. It finds particular, but not exclusive use in a Fifth Generation, 5G, system.

As part of Release 17 of the 5G specification, there is a plan to introduce an option to deactivate the Secondary Cell Group, SCG, thereby aiming to resume SCG quicker as compared to when releasing and subsequently adding the SCG.

One drawback in this plan is that the UE will need to perform certain activities while the SCG is not used, merely to facilitate quick re-activation. In other words, there is a trade-off between latency at activation and power saving while the SCG is not used (or deactivated). Details are still being decided.

However, in the specification stages, it was decided: "The UE can indicate to the Master Node, MN, that the UE would like the SCG to be deactivated. For Future Study: on the details (e.g. reusing Unified Air Interface, UAI, or existing messages, information included, etc.). Network can configure whether UE is allowed to do the indication."

Some further background information is provided In this section to provide an overview of the UE assistance available in current standards, that may serve a similar purpose as the SCG deactivation request now agreed for SCG deactivation.

In the case of overheating, there are several techniques which may be used to assist. In a first approach in Evolved-Universal Terrestrial Radio Access-New Radio Dual Connectivity, EN-DC, SCG content in a container is sent via Signaling Radio Bearer 1, SRB1, that the MN can forward transparently. In other cases, the MN receives all information and decides SCG configuration accordingly.

Also in the case of EN-DC, the UE provides NR OverheatingAssistance IE that can include a preference of Bandwidth, BW, of 0 size for both Frequency Ranges 1 and 2, FR1 and FR2. As such, there is a way to indicate a preference to have no SCG, that the MN can use as a trigger for deactivation. However, standards only allow this option for FR1. Moreover, the cause is somewhat different.

In other cases, there is no such indication i.e. there is simply a preference per FR, but not per SCG (assuming no limitations anymore regarding use of FR for SCG).

In the case of power preference, for NR SCG, configuration and reporting is separate per cell group, using SRB1 with embedding or SRB3 (both for configuration and report). This is supported for NR-DC and (NG)EN-DC. The UE can indicate 'no SCG' preference by indicating value 0 for Component Carriers, #CCs. The preference regarding BW and Multiple-input/multiple-out, MIMO, layers can again be provided per FR, while (only) for BW, value 0 is supported.

In summary, for EN-DC, the UE could indicate to the MN by means of overheating assistance that it prefers to have no SCG (by setting BW size to 0 for FR2. i.e. when FR1 is not configured, as this option is prohibited for FR1).

The SN can configure power preference assistance for the SCG, by which means the UE can indicate a preference for 'no SCG' by value 0 for #CCs. However, this information is provided to the SN rather than the MN.

However, it has been agreed that the UE assistance information is sent to the MN, which is the node that generates the RRC message including the SCG deactivation instruction.

It is an aim of embodiments of the present invention to indicate that it wishes to deactivate the SCG. Additionally, it is desirable to be able to do this without unduly complicating UE and/or system design and to minimise the impact on other features of the specification.

According to the present invention there is provided an apparatus and method as set forth in the appended claims. Other features of the invention will be apparent from the dependent claims, and the description which follows.

According to a first aspect of the present invention, there is provided a method of Quality of Experience, QoE, reporting, whereby a User Equipment, UE, transfers QoE data to a connected telecommunication network, wherein UE push mode, U Mode, is employed in all circumstances to transfer QoE information from the UE to the telecommunication network.

In an embodiment, the QoE information is transferred via use of a MeasReportAppLayer message.

In an embodiment, the MeasReportAppLayer message is used regardless of whether the QoE information is collected in idle/inactive, during pause/overload or in regular connected mode.

In an embodiment, in order to assist the network, the UE provides certain information to the network, wherein the information comprises details of certain UE capabilities.

In an embodiment, the certain information comprises information including whether it supports reporting of QoE information and/or SRB4.

In an embodiment, QoE-related restrictions are imposed, regarding whether the network can move the UE to inactive state.

In an embodiment, the network moves the UE to inactive state even if the UE has any previously collected QoE information stored.

In an embodiment, the network is operable to control whether the UE resumes QoE monitoring upon resuming connection after being idle/inactive or disconnected.

According to a second aspect of the present invention, there is provided a User Equipment, UE, arranged to perform the method of the first aspect.

According to an aspect of the present invention, there is provided a method of QoE reporting, whereby a UE transfers QoE data to a connected network. In particular, the method may find use in 5G systems, but this is not a limitation and other forms of telecommunication system may benefit from embodiments of the invention.

In a preferred embodiment, UE push mode, U Mode, is employed in all circumstances to transfer QoE information from the UE to the network. This makes use of the MeasReportAppLayer message and is used regardless of whether the information is collected in idle/inactive, during pause/overload or regular connected mode.

Further, in a preferred embodiment, in order to assist the network, the UE provides certain information to the network. This information comprises details of certain capabilities, including whether it supports reporting of QoE information and/or SRB4.

Further, in a preferred embodiment QoE-related restrictions are imposed, regarding whether the network can move the UE to inactive state. More preferably, the network moves the UE to inactive even if the UE has any previously collected QoE information stored.

In an embodiment, the network is operable to control whether the UE resumes QoE monitoring upon resuming connection after being idle/inactive or disconnected.

An aspect of the present invention is the general use of network initiated retrieval in connected mode. Some key benefits for such an approach include:

Harmonisation of the procedures used for transfer of QoE information collected during idle, inactive and in connected when pause applies. This reduces UE and network complexity. Furthermore, it limits the amount of standard specification changes.

Embodiments of the invention furthermore provide several different options regarding the further details of the unified approach, that reflect different trade offs between simplicity and flexibility e.g. more signalling changes may result in more network control/additional flexibility.

According to a third aspect of the present invention, there is provided a method of operating a User Equipment, UE, in a telecommunication network wherein the UE provides assistance information to a Master Node, MN, or a Secondary Node, SN, of the telecommunication that the UE wishes a Secondary Cell Group, SCG, to be deactivated.

In an embodiment, in the case where the UE provides assistance information to the MN, then a message, UEAssistanceInformation, is provided with a field, deactivateSCG, to indicate that it prefers SCG deactivation.

In an embodiment, a prohibit timer is used that defines a minimum time in-between UE assistance concerning SCG deactivation.

In an embodiment, the UE is configured to provide different types of assistance information simultaneously.

In an embodiment, options for simultaneous configuration of multiple UE assistance information features concerning SCG preferences include defining conditions specifying in which cases the UE triggers certain UE assistance.

In an embodiment, a first such condition is a rule defining in which case the UE triggers different UE assistance, such as defining in which condition it prefers deactivation of SCG and in which case it prefers release of SCG.

In an embodiment, a second such condition involves the network configuring a time interval which the UE observes between different SCG-related assistance indications.

In an embodiment, the assistance information includes an option to cancel a previous UE preference, including SCG deactivation.

According to a fourth aspect of the present invention, there is provided a User Equipment arranged to perform the method of the third aspect.

Although a few preferred embodiments of the present invention have been shown and described, it will be appreciated by those skilled in the art that various changes and modifications might be made without departing from the scope of the invention, as defined in the appended claims.

Figure 2:
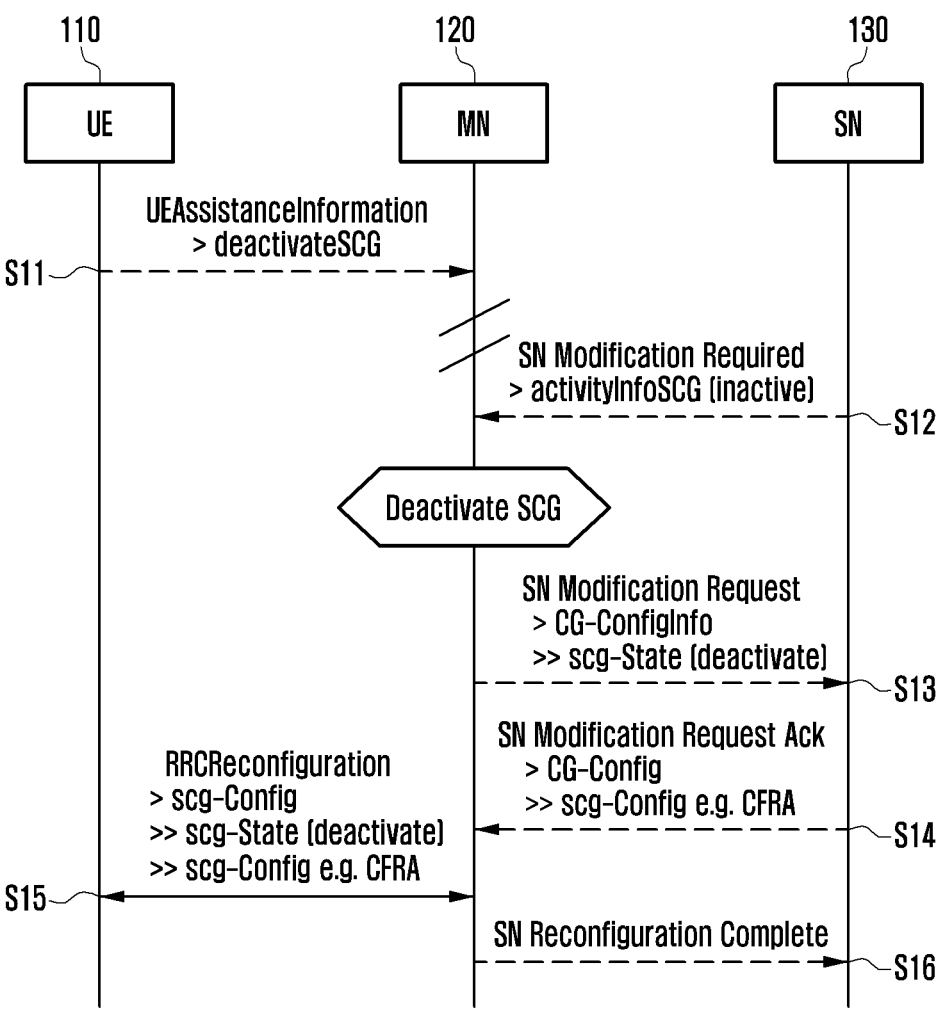
FIG. 2 illustrates a message flow according to an embodiment of the present invention.

For a better understanding of the invention, and to show how embodiments of the same may be carried into effect, reference will now be made, by way of example only, to the accompanying diagrammatic drawings in which:

FIG. 1 shows a schematic representation of various steps in an embodiment of the invention; and FIG. 2 shows a message flow according to an embodiment of the present invention.

Given the agreement to use mode U in non-pause connected (i.e. the agreement to use MeasReportAppLayer message), there are several possible harmonisation options, each forming an embodiment of the present invention.

In a first embodiment, harmonisation options include:

a) Use mode U (UE push) always i.e. use MeasReportAppLayer message (mode U) for transfer of all QoE info i.e. regardless whether collected in idle/inactive, during pause/overload or regular connected mode;

b) Partial harmonisation i.e. use network pull (mode N) for the QoE information the UE stores (i.e. QoE info collected in idle/inactive, and during pause/overload) and mode U for transfer of QoE information during non-pause connected In the following, further details of harmonised solution option a) above are presented i.e. always use UE push (mode U).

As indicated earlier, the QoE information is transferred by SRB4. The network may handle this SRB as follows, according to a second embodiment:

SRB4 may be configured to transfer previously collected QoE information that the UE has stored SRB4 may be configured when the UE is configured to report QoE information i.e. to transfer the information provided by application layers SRB4 that is configured may be suspended. This may be one way to handle RAN overload i.e. a means for network to (temporarily) pause transfer of QoE information To assist network, the UE needs to provide certain information to network according to a third embodiment. Here the UE provides the following information regarding:

Its capabilities i.e. whether it supports reporting of QoE information and/or SRB4

Whether it has any previously collected QoE information stored.

A UE that moves from idle to connected may have collected QoE information while in idle mode. The network should enable the UE to transfer this information after it enters connected mode, unless the network is overloaded. This means that certain mechanisms should be introduced, as described in the following.

When UE moves from idle to connected, it should provide an indication to network in case it has QoE information stored that it has previously collected (so network can configure SRB4).

In a fourth embodiment, when the UE moves from idle to connected, it indicates to the network that it has any previously collected QoE information stored. The UE may provide this information as follows:

1) during connection setup i.e. during RRCSetupComplete 2) by a procedure after completing connection setup e.g. the UE assistance information procedure If the UE is not configured to collect QoE information in connected, the network may release the SRB when all QoE information the UE previously collected has been transferred. To facilitate this, UE may provide an indication to network according to a fifth embodiment.

The UE indicates to the network that the transfer of QoE information is complete i.e. it that it has no further previously collected QoE information stored i.e. its storage is empty. This may be done as follows:

During transfer: An indication in the message used to transfer the QoE information e.g. a bit within the MeasReportAppLayer message UE assistance: By indicating that the previous UE assistance indicating the UE has QoE information stored is no longer valid i.e. that the previous indication is cancelled In case the network is overloaded, it may delay transfer of the QoE information, i.e. the transfer may be started at a later point in time, possibly after the UE moved to a different RAN node (gNB). To enable this, according to a sixth embodiment, when the connection of the UE moves to another RAN (master) node, the source RAN node forwards the information regarding whether the UE has any previously collected QoE information stored.

One issue is whether the network may move the UE to inactive independent of whether the UE has a certain QoE configuration and/or whether UE has previously collected QoE information stored. According to a seventh embodiment, QoE related restrictions may be defined regarding whether the network can move the UE to inactive state, including the following options:

1) No restrictions regarding QoE configuration i.e. allow transition to inactive when UE has QoE configuration, regardless of whether the concerned QoE information can be collected during inactive or whether QoE handling is suspended 2) Restrictions may or may not be specified regarding whether the UE has previously collected QoE information stored i.e. two options apply:

a) The network can only move the UE to inactive when the UE no longer has any previously collected QoE information stored b) The network can move the UE to inactive even if the UE has any previously collected QoE information stored Case 2*b*, above, may be needed as the network may not be able to retrieve QoE results due to overload. If case 2*b* is adopted then some further options may apply. One such further option is that the UE keeps stored QoE reports (while in Paused state) when going to RRC_INACTIVE if the UE also keeps the AS QoE configuration. If or when the configuration is released, then stored QoE reports, if any, are discarded According to an eighth embodiment, the UE can be moved to inactive while it has previously collected QoE information stored, including the following options:

1) During inactive, the network keeps the status in the UE context i.e. the information that the UE still has previously collected QoE information stored (so there is no need for the UE to indicate this upon return to connected)

2) The UE informs the network during resumption that it has previously collected QoE information stored. One further option is that UE provides this information only if the QoE status changed, according to a ninth embodiment, below.

In a ninth embodiment, the UE status regarding whether it has previously collected QoE information stored can change while the UE is in idle/inactive:

1. The UE may store further QoE results provided by application layer during idle/inactive (e.g. MBS)

2. The UE may discard QoE results that have become obsolete e.g. upon expiry of some timer When a UE is moved from inactive to connected while RAN is not overloaded, the UE can resume transfer of QoE information, both previously collected QoE information stored and QoE information newly provided by application layer. In a tenth embodiment, upon connection resume, the UE resumes both:

QoE configurations that were temporarily suspended e.g. because collecting the QoE information is not supported during inactive Transfer of previously collected QoE information the UE has stored When a UE is moved from inactive to connected, the RAN may be overloaded. Hence, the network should be able to avoid the case where the UE initiates transfer of large amounts of QoE information. Furthermore, there are different options regarding actual procedure and the signalling. In an eleventh embodiment, further options for resuming QoE upon connection resume include the following:

Resumption of QoE may be done as part of the Resume procedure or during a following Reconfiguration Network can control whether UE resumes QoE UE resumes SRB4 upon connection resume For transition from connected to idle, the same options apply as shown above in connection with the seventh embodiment.

In a twelfth embodiment, for transition from connected to idle, the same QoE related restrictions may apply as defined for the move from connected to inactive state, as per the seventh embodiment.

The network may configure that QoE reporting should only be done within certain parts of the network. It is clear that outside the concerned area, the UE should not transfer or collect/store QoE information. It is however not really clear whether any previously collected/stored results are affected, or controlled in other ways. Different options may apply regarding when the UE should initiate transfer of QoE information, among others, related to area configuration. In a thirteenth embodiment, options are provided regarding when the UE initiates transfer of previously collected QoE information it has stored:

1. The UE initiates transfer either:

a. only when it is in the area defined for reporting/collecting QoE information, or b. regardless of whether it is in the area defined for reporting/collecting QoE information c. when in the area for which network indicates reporting of previously collected QoE information is allowed 2. Option 1c may be realised in different manners:

a. The network configures the UE with a separate area configuration b. The network indicates on broadcast whether reporting of previously collected QoE information is allowed (may be specific to certain type of QoE information e.g. separate indication for a given service type, separate indication depending on when QoE information was collected (idle, inactive, pause)

FIG. 1 shows a message sequence for an example illustrating some aspects related to various embodiments of the present invention. The figure shows messages exchanged between UE 10 and RAN 20. The RAN 20 is then further connected to a CN (not shown).

The steps in FIG. 1 are labelled 1 to 9 and details are given below:

1. While in connected, the UE is configured to perform QoE reporting

The QoE configuration may include one or more services/service types

The QoE reporting may either apply in connected only, or also during idle/inactive (MBS)

2. The network may provide information based on which UE can determine if it is in the area in which QoE information is to be reported/collected If UE determines it is in the area, it starts QoE reporting 3. The UE reports QoE information received from application layers 4. Upon RAN overload, the network may indicate that the UE should pause QoE information reporting The UE will store the QoE information collected during pause 5. the network moves the UE to idle or inactive In case the UE is moved to inactive, the network may keep QoE configuration and status (regarding whether the UE has previously collected QoE information stored)

6. the network may provide information based on which the UE can determine if it is in the area in which QoE information is to be reported/collected If the UE determines it is in the area, it collects/stores QoE results provided by application layers If configured with QoE reporting that applies during idle/inactive (MBS)

7. the UE returns to connected

The UE indicates QoE status i.e. whether previously collected QoE information stored If the UE returns from inactive, this may be done only if QoE status changed while it was in inactive During transition to connected, the network can control whether the UE can resume transfer of QoE information it has. E.g. by establishing SRB4 or by initiating resumption of SRB4 (return from inactive)

8. the Network may provide QoE related configuration

This may comprise other configurations and SRB4 configuration

In case of returns from inactive, the network only needs to signal changes compared to the configuration used when the UE was previously in connected 9. the UE reports QoE information This may include QoE received from application layers This may include QoE information previously collected by the UE In an embodiment, the UE provides assistance for SCG deactivation to SN. It should be noted that it has not been explicitly excluded that deactivation by MAC CE may be sent via the SCG leg. Such an option may be possible in case all RBs using SCG resource are SN terminated, as in such cases, the SN can coordinate SCG deactivation by itself. In such a scenario, it would be preferable if the UE indicates to the SN that it prefers to have 'noSCG'. Such an approach is possible according to existing standards, as indicated above.

For SCG deactivation, the existing UAI defined for power preference is re-used to indicate to the SN that it prefers to have no SCG. This option may be used, for instance, in case all RBs using SCG resources are SN terminated and/or the network can use a MAC CE sent via SCG leg to deactivate the SCG.

In a further embodiment, UE assistance for SCG deactivation is provided to the MN. As indicated previously, it has been agreed that the UE provides the assistance for SCG deactivation to MN. To do this, the UEAssistanceInformation is extended with a field by which the UE can indicate that it prefers SCG deactivation e.g. deactivateSCG.

In a further embodiment, options for when the UE may trigger sending the UEAssistanceInformation to indicate that it prefers SCG deactivation include the following:

a) No conditions are specified i.e. it is entirely left up to UE implementation b) A prohibit timer is used that defines the minimum time in-between UE assistance concerning SCG deactivation (interval applies to both the time between on and off and between off and on)

c) A unidirectional prohibit timer i.e. the minimum time only applies for the time between on and off (to avoid latency at activation)

d) The time the UE was not using SCG resources for UL data transfer (possibly taking int account existing rules defined regarding which leg to use for a split RBs)

e) Combinations of the above

The UE may further be configured to provide different types of UE assistance at the same time. In particular the following UE assistance: UE in EN-DC: Overheating assistance; and/or UE in NR-DC: Power preference for SCG.

In a further embodiment, options for simultaneous configuration of multiple UE assistance information features concerning SCG preferences, include the following:

a) Simultaneous configuration of multiple of such UE assistance features is not supported b) Simultaneous configuration of multiple of such UE assistance features is supported, with the following 1) Conditions are specified defining in which cases UE triggers certain UE assistance. e.g.

i. A rule is defined defining in which case UE triggers the different UE assistance e.g. defining in which condition it prefers deactivation of SCG and in which case it prefers release of SCG ii. The network can configure a time interval which the UE shall observe between the different SCG related UE assistance indications 2) It is left up to UE implementation when the UE triggers the different SCG related UE assistance indications UE assistance includes the option to cancel a previous UE preference. This also applies for the SCG deactivation. However, it is presently not clear how this relates to SCG activation, i.e. whether the UE assistance to cancel SCG deactivation preference is the same as UE assistance for SCG activation request. This matter may therefore we be left to UE implementation or may require further study.

In a further embodiment, options for simultaneous configuration of other UE assistance information concerning SCG preferences include when the UE may trigger sending the UEAssistanceInformation to indicate that it prefers SCG deactivation and may include the following:

a) Support cancellation of UE assistance indication SCG deactivation preference b) Alongside support UE assistance for indicating SCG activation preference c) Options for use of these UE assistances to indicate preference to activate a deactivated SCG include the following 1) UE can either provide assistance indicating cancellation of the SCG deactivation preference or provide assistance indicating SCG activation preference. This option may apply only in specific cases e.g. when UE provided assistance indicating preference to deactivate 2) UE can only provide assistance indicating SCG activation preference. This may apply only in specific cases e.g. when UE did not provide assistance indicating SCG deactivation preference FIG. 2 shows a message sequence for an example illustrating some aspects related to various embodiments of the present invention. The figure shows message exchanges between UE 100, MN 110 and SN 120.

In more detail, the steps in FIG. 2 are described below.

S11. UE indicates a preference to deactivate the SCG

S12. SN indicates that SCG is inactive/requests SCG deactivation

Note that the two messages S11, S12 may appear in a different order

S13. MN initiates to SN that SCG should be deactivated

S14. In response, the SN may provide SCG configuration information

S15. The MN indicates the SCG deactivation to the UE and may include any SCG reconfiguration provided by SN e.g. CFRA resources to be used at activation S16. Upon receiving Reconfiguration complete from the UE, the MN confirms successful deactivation to SN Embodiments of the present invention include options for the UE to provide assistance regarding SCG deactivation, taking into account the currently defined framework. It provides different alternatives, balancing simplicity and flexibility. For instance, more signalling changes may result in more network control and/or additional flexibility, such as better control of which information the UE should signal to the network.

Figure 3:
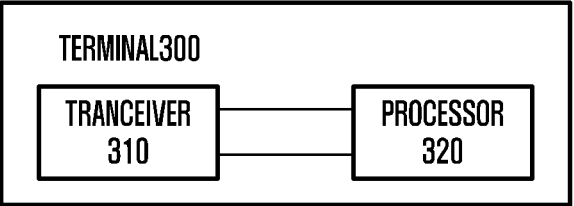
FIG. 3 illustrates a schematic diagram of a terminal according to an embodiment of the present disclosure.

FIG. 3 illustrates a schematic diagram of a terminal 300 according to an embodiment of the present disclosure. The terminal includes User Equipment (UE).

As shown in FIG. 3, the terminal 300 according to an embodiment of the present disclosure may include a transceiver 310 and a processor 320. The transceiver 310 may be configured to transmit and receive signals. The processor 320 may be configured to (e.g., control the transceiver 310 to) perform methods performed by the terminal according to the embodiments of the present disclosure.

For example, the processor can be configured to receive, from a base station, a first reconfiguration message for configuring a report of QoE information, receive, from the base station, information for determining whether or not the UE is in an area in which the QoE information is to be reported; and report, to the base station, the QoE information based on a determination that the UE is in the area in which the QoE information is to be reported using the information. The processor can be further configured to transmit, to the base station, capability information on whether the US supports a report of the QoE information. Also, the processor can be configured to receive, from the base station, a second reconfiguration message for indicating to pause the report of the QoE information and store the QoE information during a pause period.

The processor can be further configured to receive, from the base station, a third reconfiguration for transitioning a state of the UE from a connected state to an idle state and in case that the UE transition from the idle state to the connected state, transmit, to the base station, information for indicating that the QoE information is stored.

Figure 4:
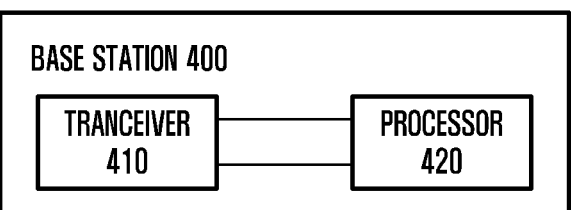
FIG. 4 illustrates a schematic diagram of a base station according to an embodiment of the present disclosure.

FIG. 4 illustrates a schematic diagram of a base station 400 according to an embodiment of the present disclosure.

The base station includes at least one of RAN (radio access network) node, gNB, mast er node, or secondary node.

As shown in FIG. 4, a base station 400 according to an embodiment of the present disclosure may include a transceiver 410 and a processor 420. The transceiver 410 may be configured to transmit and receive signals. The processor 420 may be configured to (e.g., control the transceiver 410 to) perform methods performed by the base station according to the embodiments of the present disclosure.

For example, the processor can be configured to transmit, to a user equipment, a first reconfiguration message for configuring a report of QoE information; transmit, to the UE, information for determining whether or not the UE is in an area in which the QoE information is to be reported; and receive, from the UE, the QoE information based on a determination that the UE is in the area in which the QoE information is to be reported using the information. The processor can be further configured to receive, from the UE, capability information on whether the US supports a report of the QoE information. The processor can be configured to transmit, to the UE, a second reconfiguration message for indicating to pause the report of the QoE information, wherein the QoE information is stored in the UE during a pause period. Also, the processor can be configured to transmit, to the UE, a third reconfiguration for transitioning a state of the UE from a connected state to an idle state; in case that the UE transition from the idle state to the connected state, receiving, from the UE, information for indicating that the QoE information is stored.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method performed by a user equipment (UE) supporting a dual connectivity (DC) in a wireless communication system, the method comprising:

receiving, from a master node (MN) configuration information associated with a preference of a secondary cell group (SCG) deactivation;

transmitting, to the MN, a UE assistance information message associated with SCG deactivation preference information indicating that the UE prefers an SCG to be deactivated; and receiving, from the MN, a radio resource control (RRC) message including SCG state indicating the SCG deactivation, wherein the UE assistance information message associated with the SCG deactivation preference information is transmitted based on a prohibit timer for a minimum time for transmitting the UE assistance information message associated with the SCG deactivation and a time during which the UE was not using SCG resources for an uplink (UL) data transfer by considering a rule defining a leg for split radio bearers (RBs).

2. The method of claim 1, wherein the UE assistance information message further includes overheating assistance information.

3. A method performed by a master node (MN) in a wireless communication system, the method comprising:

transmitting, to a user equipment (UE), configuration information associated with a preference of a secondary cell group (SCG) deactivation;

receiving, from the UE, a UE assistance information message associated with SCG deactivation preference information indicating that the UE prefers an SCG to be deactivated; and transmitting, to the UE, a radio resource control (RRC) message including SCG state information indicating the SCG deactivation, wherein the reception of the UE assistance information message associated with the SCG deactivation preference information is based on a prohibit timer for a minimum time for transmitting the UE assistance information message associated with the SCG deactivation and a time during which the UE was not using SCG resources for an uplink (UL) data transfer by considering a rule defining a leg for split radio bearers (RBs).

4. The method of claim 3, wherein the UE assistance information message further includes overheating assistance information.

5. A user equipment (UE) supporting a dual connectivity (DC) in a wireless communication system, the UE comprising:

a transceiver; and a controller coupled with the transceiver, and configured to:

receive, from a master node (MN), configuration information associated with a preference of a secondary cell group (SCG) deactivation, transmit, to the MN, a UE assistance information message associated with SCG deactivation preference information indicating that the UE prefers an SCG to be deactivated, and receive, from the MN, a radio resource control (RRC) message including SCG state information indicating the SCG deactivation, wherein the UE assistance information message associated with the SCG deactivation preference information is transmitted based on a prohibit timer for a minimum time for transmitting the UE assistance information message associated with the SCG deactivation and a time during which the UE was not using SCG resources for an uplink (UL) data transfer by considering a rule defining a leg for split radio bearers RBs).

6. The UE of claim 5, wherein the UE assistance information message further includes overheating assistance information.

7. A master node (MN) in a wireless communication system, the MN comprising:

a transceiver; and a controller coupled with the transceiver, and configured to:

transmit, to a user equipment (UE), configuration information associated with a preference of a secondary cell group (SCG) deactivation, receive, from the UE, a UE assistance information message associated with SCG deactivation preference information indicating that the UE prefers an SCG to be deactivated, and transmit, to the UE, a radio resource control (RRC) message including SCG state information indicating the SCG deactivation, wherein the reception of the UE assistance information message associated with the SCG deactivation preference information is based on a prohibit timer for a minimum time for transmitting the UE assistance information message associated with the SCG deactivation and a time during which the UE was not using SCG resources for an uplink (UL) data transfer by considering a rule defining a leg for split radio bearers (RBs).

8. The MN of claim 7, wherein the UE assistance information message further includes overheating assistance information.

* * * * *